(12) United States Patent
Gonzales (10) Patent No.: US 7,271,707 B2
(45) Date of Patent: Sep. 18, 2007

(54) DEVICE AND METHOD FOR PRODUCING A THREE-DIMENSIONALLY PERCEIVED PLANAR TACTILE ILLUSION

(75) Inventor: Gilbert R. Gonzales, 114 E. 71st St., Apt. 6E, New York, NY (US) 10021

(73) Assignee: Gilbert R. Gonzales, New York, NY (US)

( * ) Notice: Subject to any disclaimer, the term of this patent is extended or adjusted under 35 U.S.C. 154(b) by 134 days.

(21) Appl. No.: 11/034,319

(22) Filed: Jan. 12, 2005

(65) Prior Publication Data

US 2005/0173231 A1     Aug. 11, 2005

Related U.S. Application Data

(60) Provisional application No. 60/535,880, filed on Jan. 12, 2004.

(51) Int. Cl.
*H04B 3/36*    (2006.01)
*G08B 6/00*    (2006.01)
*G09B 21/00*   (2006.01)

(52) U.S. Cl. ............... 340/407.1; 340/407.2; 340/825.19; 340/7.6; 434/113; 434/114

(58) Field of Classification Search ............. 340/407.1, 340/407.2
See application file for complete search history.

(56) References Cited

U.S. PATENT DOCUMENTS 3,919,691 A * 11/1975 Noll ........................... 345/419
4,840,567 A * 6/1989 Litt ............................. 434/114
5,719,561 A    2/1998 Gonzales ............... 340/825.46
6,326,901 B1   12/2001 Gonzales ............... 340/825.46
6,694,652 B1 * 2/2004 Jeha ............................ 40/615

OTHER PUBLICATIONS

Carl E. Sherrick et al., *Apparent Haptic Movement*, Perception & Psychophysics, 1966, vol. 1, 3pgs.
Gilbert R. Gonzales et al., *Fingertip Communication: A Tactile Communication Device for a Glove*, Article, Sep. 23, 1999, 6 pgs.
Gilbert R. Gonzales, M.D., *Symbol Recognition Produced by Points of Tactile Stimulation: The Illusion of Linear Continuity*, May Clin Proc, Nov. 1996, vol. 71, 8 pgs.
Gilbert R. Gonzales, M.D. et al., *Tactile Illusion-Produced Number Perception in Blind and Sighted Persons*, Mayo Clin Proc, Dec. 1998, vol. 73, 4 pgs.

* cited by examiner

*Primary Examiner*—Donnie L. Crosland
(74) *Attorney, Agent, or Firm*—Wood, Herron & Evans, LLP (57) ABSTRACT

A tactile communications device includes a two dimensional surface configured to be positioned in contact with a wearer for tactual stimulation. A plurality of actuators are positioned on the surface and arranged in a generally planar array. Various of the actuators are operable for being sequentially activated, line-by-line, to produce a non-veridical perception of a three dimensional surface.

19 Claims, 8 Drawing Sheets

DEVICE AND METHOD FOR PRODUCING A THREE-DIMENSIONALLY PERCEIVED PLANAR TACTILE ILLUSION

RELATED APPLICATIONS

The application claims the benefit of the priority of U.S. Provisional Application Ser. No. 60/535,880, entitled "Three-Dimensionally Perceived Planar Tactile Illusion Device and Method," filed Jan. 12, 2004, which application is incorporated herein by reference in its entirety.

FIELD OF THE INVENTION

The invention is directed generally to the creation of an illusory perception for a person.

BACKGROUND OF THE INVENTION

Generally, a human has multiple senses that operate to perceive and gather information regarding their surroundings or an object or system that they are interacting with. Such senses have some defined parameters with respect to the sensory stimulus that may be perceived. For example, the sense of sight is traditionally used to visually perceive information, while the sense of touch may be traditionally used to perceive the physical nature of an item such as its texture or shape. To convey information, audio-visual methods and devices have traditionally been used.

In some applications, it is desirable to convey to a human various information in a nontraditional fashion. That is, it may be useful to convey information to a human using a sense that is normally traditionally reserved for gathering another type of information. This may be done so by creating an illusion with one sense, for example touch, that conveys information that might traditionally be perceived by other senses such as audiovisual senses. The use of touch for communication is sometimes referred to as tactile communication. For example, such tactile communication, the physical mode of it, and various devices for doing the same are disclosed in U.S. Pat. Nos. 5,719,561 and 6,326,901, both entitled "Tactile Communication Device and Method" (owned by the current inventor). Both patents are incorporated herein by reference in their entireties. The disclosed devices create the illusion of motion to deliver information to a person through touch that might traditionally be perceived through a sense of sight. Each of those patents discloses actuator systems that produce the illusion of linear continuity motion for the purpose of creating alphanumeric characters and for position localization (i.e., instrument landing system). These devices generally involve individual actuators that are activated to provide the tracing of an alphanumeric pattern and/or symbol. However, such systems are not able to produce a 3-D illusion of depth contour and shape, etc.

Generally, the ability to perceive or feel three-dimensional contour, shape, depth and/or height of a contoured surface on the skin or another area, such as a mucous membrane, has generally only been possible by applying the contoured surface against the skin or membrane. Alternatively, such perception might be facilitated by applying the skin surface or other surface, such as the fingertip, against the contoured surface and by moving the fingertip across the contoured surface. In those various scenarios, a person is able to determine the shape of the three-dimensional object and the surface characteristics.

Devices do exist that allow a human extremity or a digit to move in space as if moving over a surface, but fine details of the contour of an object are not perceived. Also, with such devices, the extremity or digit must actually move in space in order to "feel" an object. In addition, a tactile illusion, such as the tactile phi phenomenon, is not produced. One example of a device that apparently gives force feedback but not a tactile 3-D illusion is the PHANToM device, which is defined at the following website: http://www.hoise.com/vmw/02/articles/vmw/LV-VM-11-02-35.html). Therein, the device is described generally as like a pen which can slide across a surface in a VR world. You can feel the texture and density of the surface. Pushing on the pen sends data representing forces through the Internet, which can be interpreted by another PHANToM and felt on the other end. A person feels the resulting force, and also gets a sense of the quality of the object you are feeling, whether it is soft or hard, woodlike or fleshy.

Another device is designated as the Thimble Gimble, and described at the website http://www.ntsc.navv.mil/Programs/Tech/Virtual/VETT/transformations.cfm. A limitation of such a device is noted in that it is mounted on a fixed component in the real environment and, therefore, does not move or rotate with movements of a trainee. To use the device, the trainee must move to it. A trainee-mounted controller is noted as possible, but may be awkward and may interfere with the training task.

As such, no devices or methods exist that are able to produce the non-veridical illusion of three-dimensional contour on the surface of the body, other than those physical methods described above which have various drawbacks or fall short of conveying three-dimensional surface contours.

SUMMARY OF THE INVENTION

The present invention is directed to a device and method of providing non-veridical three-dimensional perception of a distant veridical three-dimensional surface or form, using a sweeping planar array of mechanical system actuators that move, stimulate and/or vibrate against a sensing surface of a human, such as the skin, mucous membrane, or some other suitably tactile sensing area of a human body. The stimulators or actuators of a planar array are sequentially activated in linear groups or lines of actuators and may be vibromechanical, pneumatic, ultrasonic, shape memory alloy, piezoelectric, ceramic bimorph, thermo-actuating, or micro-electrical mechanical system stimulators.

The actuators are arranged in a two-dimensional array over the sensing surface and groups or lines of actuators are triggered sequentially line-by-line. In one embodiment, the actuators are arranged in parallel lines, including two or more stimulators, and are sequentially activated. The array is activated line-by-line in a scrolling sequential fashion to define a baseline reference. A parallel line of two or more actuators might be used with actuators added (activated) or subtracted (deactivated), in each subsequent or successive sequential scroll to produce a three-dimensional perception or sensation of depth, elevation and contour on the sensing surface. The wearer cognitively perceives the tactual stimulation as a sweeping and moving continuous wave of tactual stimulation that, as it progresses across the skin, produces the non-veridical perception of depth, height and contour corresponding to a distant veridical form. Using the closely spaced and selectively triggered actuators that "sweep" across the skin, whereby a line of actuators is simultaneously activated, produces a sense or perception of three-dimensions by the sensing surface and without the sensing surface actually touching the three-dimensional veridical surface being examined.

BRIEF DESCRIPTION OF THE DRAWINGS

The accompanying drawings, which are incorporated in and constitute a part of this specification, illustrate embodiments of the invention and, together with the detailed description of the embodiments given below, serve to explain the principles of the invention.

FIG. 7A illustrates another alternative array of actuators, while

FIG. 8A illustrates another alternative array of actuators, while

DETAILED DESCRIPTION

Figure 1:
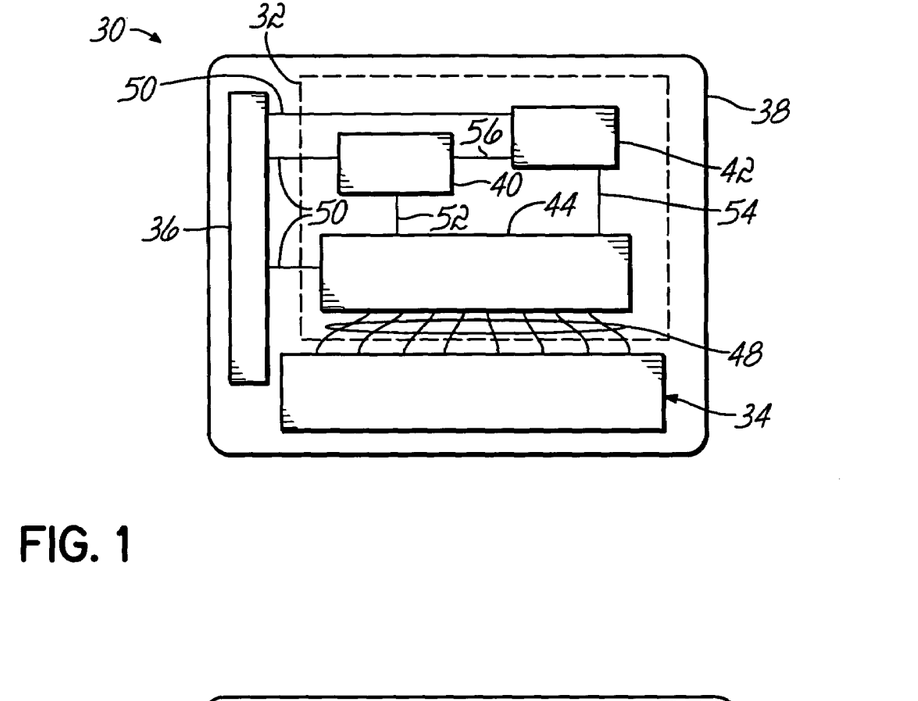
FIG. 1 is an elevational view of an embodiment of the tactile communication device of the invention.

FIG. 1 depicts one form of a tactile communication device for realizing the present invention. The device 30 is not limiting with respect to the inventive method or device for controlling an array to affect the results of the invention. FIG. 1 depicts an embodiment of the present invention as a tactile communication device 30 that includes a control module 32, an actuator or stimulator array 34, a power source 36, and an appropriate housing 38 or support for array 34 and supporting components. Tactile communication device 30 is an electromechanical device capable of receiving input signals transmitted to tactile communication device 30 from a remote device and then delivering the input to the user of tactile communication device 30, such as a human sensing surface 39, to create a tactually sensed non-veridical perception of the three-dimensional surface 33.

Control module 32 of FIG. 1 may include a data receiver 40, a memory module 42 and a conversion module 44. Data receiver 40 receives input signals and comprises an appropriate electronic data reception capability. As a receiver, data receiver 40 may receive messages in the form of an input signal data stream from a remote sensor. The data stream itself may include analog, digital or combinations of these forms or other forms. Data receiver 40 is electronically connected to memory module 42 via a bus 56. Data receiver 40 is also electronically connected to a processing or conversion module 44 through a bus 52. Memory module 42 is electronically connected to processing module 44 through a bus 54.

Power source 36 delivers electrical energy to the components through electrical connections 50. Control and powering of the actuators in array 34 is handled through a plurality of electrical connections 48 between control module 32 such as processing module 44 and the array to individually and sequentially scroll through the activation of lines of actuators as discussed below.

Figure 2:
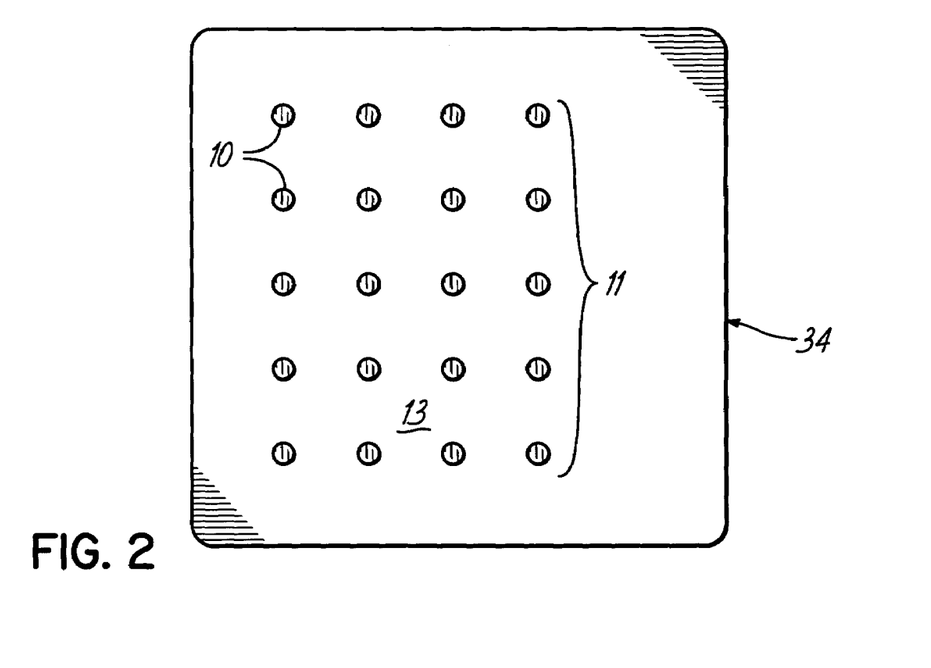
FIG. 2 is a bottom view of the embodiment of FIG. 1 illustrating an array of actuators.

FIG. 2 illustrates one possible actuator array 34 having a plurality of actuators 10 arranged in a three-dimensional array 11 on a suitable base or support surface.

Referring now to FIGS. 1A-1D, a plurality of stimulators or actuators 10 are arranged, such as on a suitable base 13. The actuator 10 may be any suitable activatable actuator for realizing the invention, such as microelectrical mechanical systems (MEMS), solenoids, shape memory alloys (SMA), pneumatic elements, thermal displacement, or other actuating elements, piezo electric elements, ceramic bimorphs, magnetic switches, vibromechanical elements, ultrasonic elements. These are some possible actuators and methods of actuation that impinge upon a sensing surface to be sensed by the surface, such as to produce vibration on the skin or mucous membrane at stationary points to for tactile communication, for example. Various such methods of tactile communication and the physical components involved therein are described in greater detail in U.S. Pat. Nos. 5,719,561 and 6,326,901, noted above and incorporated by reference herein in their entireties. In one embodiment, the actuator functional parameters for this invention may be similar to or the same as the parameters for the device in U.S. Pat. No. 5,719,561, including actuator on-time, actuator off-time, number of vibrations per actuation or actuator group, and U.S. Pat. No. 6,326,901.

However, the present invention has an actuation scheme that is different than the activation scheme set forth in U.S. Pat. Nos. 5,719,561 (the '561 patent) and 6,326,901 (the '901 patent). The tactile communication of the present invention uses sequential actuation of groups or lines of actuators to form the non-veridical illusion of a three-dimensional contoured surface. In the embodiment illustrated in the figures, the individual actuation rows or columns of multiple actuators (i.e., a linear group of actuators) are activated in parallel or simultaneously. Multiple rows/columns make up an array, and the rows/columns (i.e., rows or columns of multiple actuators) are each then sequentially activated in a scrolling fashion to provide a sense or perception of depth and/or elevation to a human contact surface such as a fingertip or a mucous membrane. The actuators, in whatever form is utilized, provide a point stimulation of the contact surface. It is the multiple actuator points that make a row column or line of stimulation, and it is the sequential row/column-by-row/column or, line-by-line actuation that creates the perception or illusion of a non-veridical three-dimensional (3D) surface representing a veridical 3D or contoured surface in accordance with aspects of the invention.

Figure 3A:
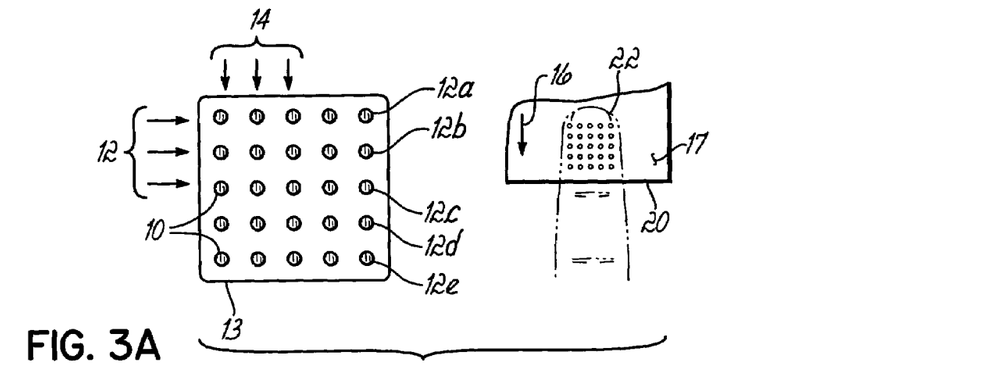
FIGS. 3A-3D graphically illustrate an array of actuators in accordance with the principles of the present invention, for producing a perception of movement of a user's fingers over an edge.

Referring to FIGS. 3A-D and 4A-E, an array 13 of actuators 10 is distributed in a three-dimensional planar linear pattern in both the X and Y axes, or both horizontally and vertically. Referring to FIG. 3A, horizontal lines or rows 12 of multiple side-by-side actuators are defined along imaginary X axes and each row includes a plurality of individual actuators 10. As such, the multiple rows 12 of actuators are positioned together to form the array 13. The array also defines what might be considered multiple lines or columns 14 arranged vertically along imaginary Y axes of the array. In FIGS. 3A-3D and 4A-4E, a 5×5 array of actuators are illustrated. This presents 5 generally parallel lines. FIGS. 3A-3D and 4A-4E illustrate an array for tactile communication of a surface having perceived edges that define a three-dimensional surface 17. The edges 20, 21 are produced, in accordance with the present invention, by the sequential activation of individual lines of actuators 10, such as individual horizontal rows 12 or individual vertical columns 14 of actuators 10. Generally, for the purpose of perceiving edge 20, the rows are activated line-by-line, in the direction of arrow 16 in accordance with one aspect of the invention. The rows are sequentially activated line-by-line in a sequential scrolling fashion to provide a specific number of cycles of stimulation to a receptor or sensing surface such as the fingertip 22 of a human. When a row, such as row 12a, is activated in one embodiment, all the actuators of that row, for instance five, are simultaneously (in parallel) activated, with all five generally having the same settings for actuation, in one example. As discussed further below, it may be that selective actuators of a row are not activated to define a desired baseline. But generally enough actuators 10 of a row are simultaneously activated to define the row for creating a baseline reference for the perception.

The actuators 10 of a row 12 are activated for a particular length of time, then the next sequential row or rows 12 are activated, and so on, in scrolling fashion, until all of the rows have been activated. Then, after a delay, the array is again activated in a repeat scrolling row(s) by row(s) (line-by-line) fashion. For example, an on-time of 10 msec for the actuators, an off-time of 10 msec and five vibrations or cycles per actuator in total may be used. Next, after an inter-row or inter-column delay, the next row or column is similarly activated. This is just one example, and other activation parameters might be utilized as discussed in U.S. Pat. Nos. 5,719,511 and 6,326,901.

More specifically, referring to FIGS. 3A-3D, sequentially, another row 12b of actuators is activated after row 12a with each of the activators being activated in parallel or simultaneously until rows 12c, 12d, and 12e are activated. This group-by-group, or line-by-line, activation occurs in a sweeping or scrolling fashion (arrow 16) until the last row is activated. Then, the first row 12a is again activated and another scrolling sweep or multiple scrolling sweeps of the array continue in that same fashion.

Figure 3B:
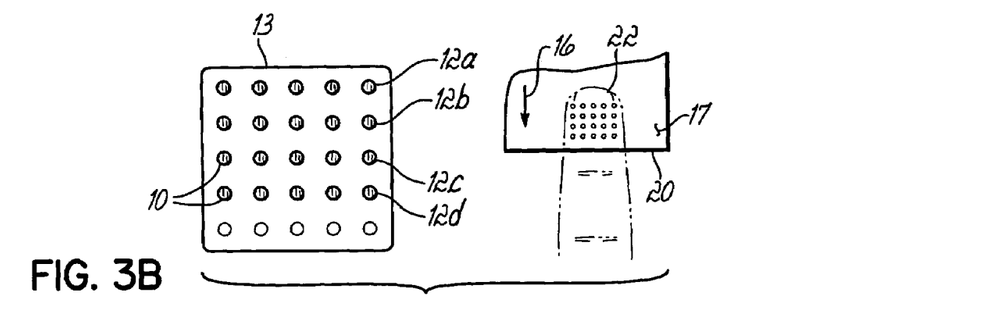

An inter-actuator (if solenoids are used) time of 0 to 10 msec may separate the activity of the first row 12a of actuators and the second row 12b or other sequential rows of actuators. As noted, this sequence continues until the fifth set or row of actuators 12e is activated. Then, the first set is again activated and the sequential activation continues in the scrolling fashion. The scrolling continues in the same direction in the array.

As illustrated in FIG. 3A, the sequential row-by-row activation of the actuator rows 12a-e, and the simultaneous or parallel activation of each actuator 10 in the row at the time of row activation, provides a perception, as illustrated in FIG. 3A, of a generally flat three-dimensional surface. This is the baseline reference. The addition or subtraction (i.e., the activation or lack of activation or deactivation) of entire actuator rows 12 or of individual actuators 10 in a row 12 creates a more dense or less dense set of vibrations, as well as a sense of elevation and depth, or non-veridical three-dimensional perception of a 3D surface as discussed further below. Activating all of the rows 12a-12e and the predetermined number of activators in each row forms a zero-asperity or essentially zero depth/height baseline. Then using selective deactivation or selective activation of certain rows 12 in the array, and/or certain actuators 10 in a selected row 12, the three-dimensional illusion or perception is created.

Figure 3C:
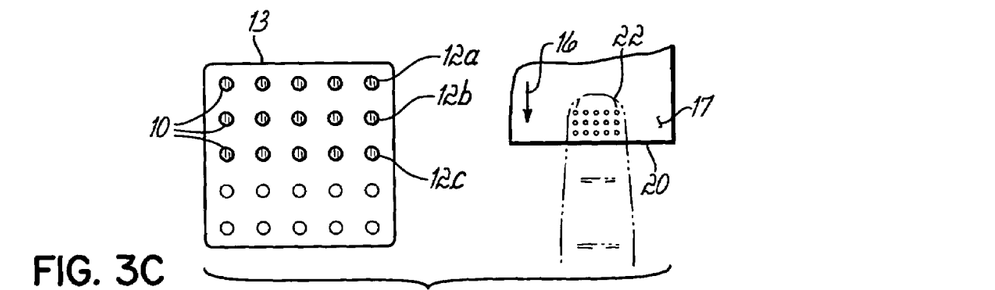
Figure 3D:
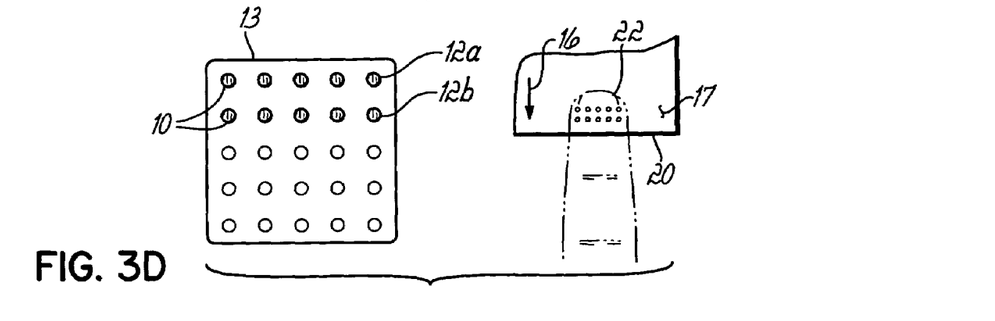

For example, as illustrated in FIGS. 3A-3D, the rows 12 of actuators are actuated in a scrolling fashion. To create the non-veridical perception of a surface edge 20, a particular row of actuators 12 is deactivated as the scrolling 16 continues. Referring to FIG. 3B, row 12e has been deactivated, which is perceived as a fingertip moving vertically downward on a surface and toward the edge 20 of a surface. As shown on the right side of FIG. 3A, all the actuators, or rather all rows of actuators, are perceived, when activated, to define the baseline or zero asperity, or baseline, reference, and the fingertip would not perceive the edge. However, as each row is sequentially deactivated, the fingertip 22 perceives the edge 20 as a change in depth perception from the zero asperity reference. Additional rows, such as rows 12d and 12c, are also sequentially deactivated, as illustrated in FIGS. 3C and 3D, and as shown on the right sides of those figures, the fingertip 22 perceives that it is moving with respect to the perceived edge 20, such as downwardly over the edge. The edge 20 is perceived as a sudden or deep depth (i.e., no surface) from the baseline or zero-asperity reference.

Figure 4A:
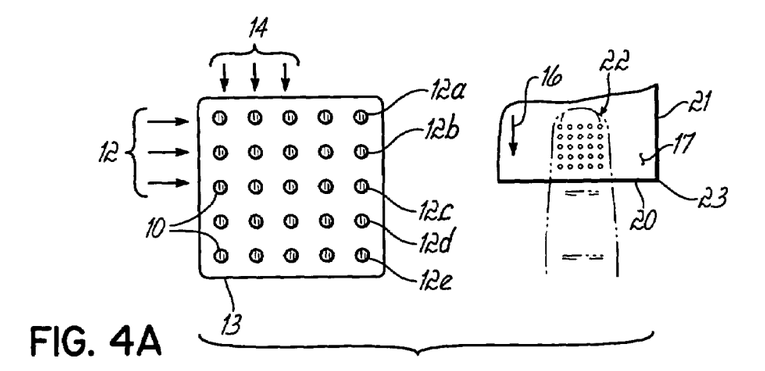
FIGS. 4A-4E illustrate another array of actuators for producing a perception of a surface with multiple edges.
Figure 4B:
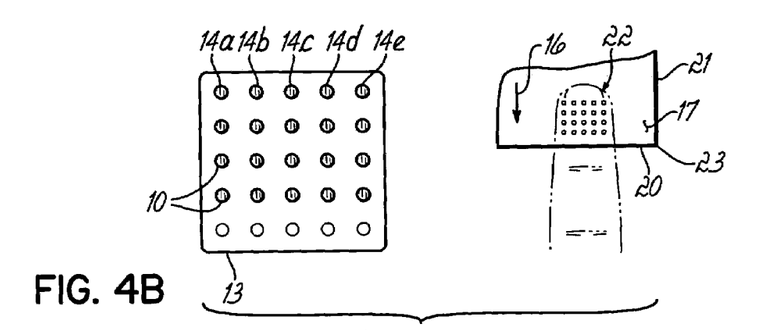
Figure 4C:
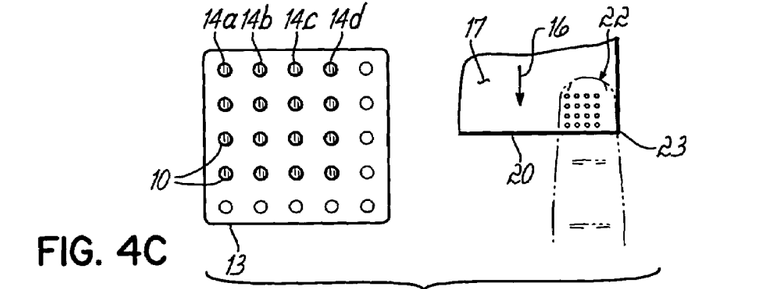
Figure 4D:
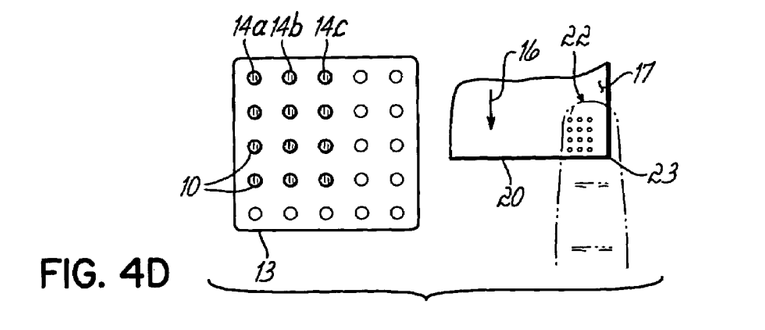
Figure 4E:
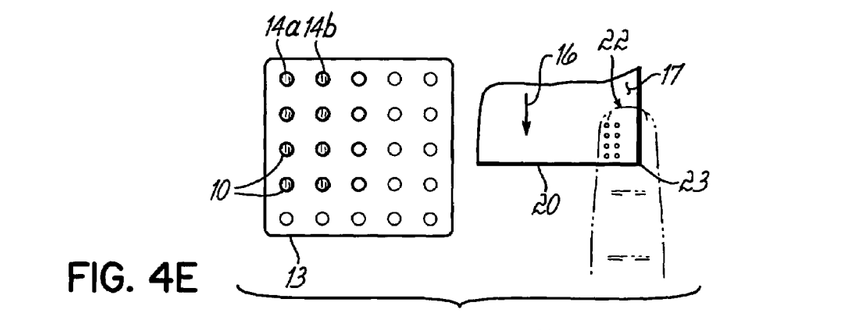

FIGS. 4A-4E illustrate another embodiment of the invention utilized to perceive not only the lower edge 20 of a surface, but also the side edge 21 and, consequently, a corner 23. FIGS. 4A and 4B resemble FIGS. 3A and 3B above, wherein a zero asperity reference is defined, by activating all, or a predetermined number, of the actuators in the rows and sequentially activating each of the rows in a scrolling fashion. Then one row (e.g., row 12e) is selectively deactivated. Sequential, scrolling, and selective activation of the various rows, as well as deactivation of one or more of the rows, provides perception of movement over a three-dimensional surface having a bottom edge 20. Alternatively, as illustrated in FIGS. 4C-4E, individual columns of 14a-14e of actuators 10 can be deactivated. Referring to FIG. 4C, column 14e has been deactivated. Next, other adjacent actuator columns 14 are deactivated. In FIGS. 4D and 4E, columns 14c and 14d have been deactivated. Such selective deactivation creates the perception of a finger moving, as illustrated on the right side of FIGS. 4A-4E. Specifically, the selective activation/deactivation pattern shown in FIGS. 4A-4E provides a perception of a finger moving over a three-dimensional surface which not only has a bottom edge 20, but also a side edge 21 and particularly a right edge and a corner 23.

As may be appreciated, the present invention utilizing selective activation of sets of actuators, such as straight rows or columns of actuators, may be used to provide a non-veridical illusion of the three-dimensional aspects of a surface.

Figure 5A:
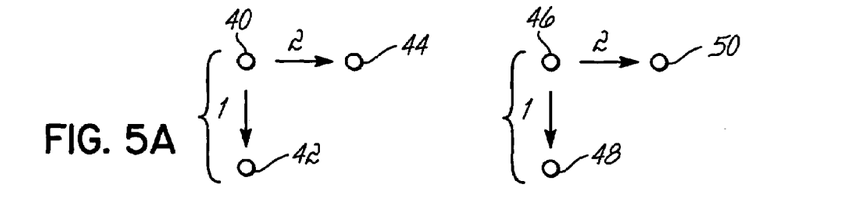
FIGS. 5A-5D illustrate alternative arrays and excitations of actuators of the invention.
Figure 5B:
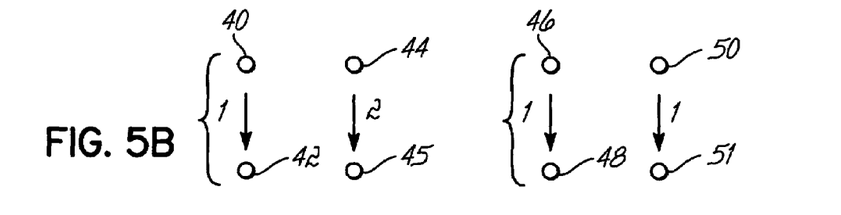
Figure 5C:
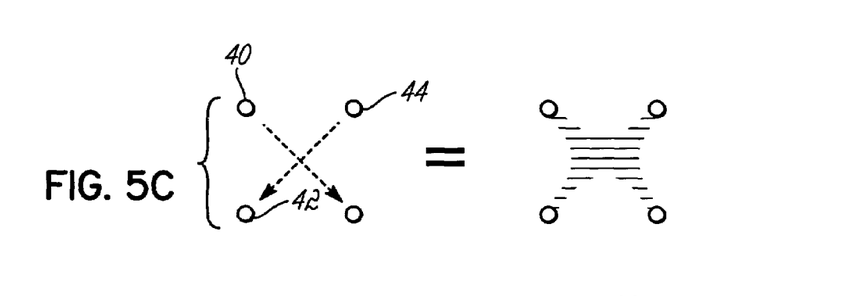

FIGS. 5A-5C illustrate additional arrays to illustrate the ways that actuators might be activated. Particularly, FIG. 5A illustrates an array utilizing three actuators, which are sequentially activated, or simultaneously activated, as illustrated by the arrows. Actuator elements 40, 42, and 44 illustrate actuation 40 and 42 being sequentially activated in the indicated direction and then thereafter actuators 40 and 44 sequentially in the indicated direction. However, actuators 46, 48 and 50 are all shown simultaneously activated in the indicated direction. Similarly, FIG. 5B discloses a 2×2 array wherein the individual columns of actuators are sequentially or simultaneously activated, as indicated by the arrows. The actuators 40, 42 making a first column are activated in the indicated direction, while the actuators 44, 45 making a second column are then activated in the indicated direction after the first column. Alternatively, a first column of actuators 46, 48 might be simultaneously activated with a second column of actuators 50, 51. With only single sweeps across adjacent actuators or with the first sweep of the illusion of a surface, there is an incomplete sense of sharp edges or "scalloping" of the edges, both horizontally and vertically along the edges of the perceived planar non-veridical illusion, as shown in FIG. 5C and on the top half of FIG. 5D. However, subsequent scrolling produces a solid rectangular and even sense of surface with each subsequent scrolling in order to define the zero-asperity baseline.

FIG. 5C discloses a 2×2 array of actuators, wherein when the actuators are sequentially activated, there is cross talk, as illustrated on the left side of the figure, to yield a perceived three-dimensional surface, as shown on the right side of FIG. 5C.

Figure 5D:
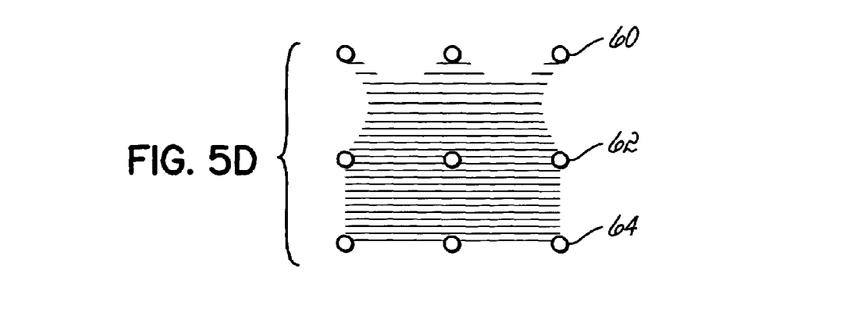

FIG. 5D, on the other hand, reveals a 3×3 actuator array, wherein the individual actuator rows 60, 62, and 64 may be selectively and sequentially activated for creating a three-dimensional surface.

Figure 6A:
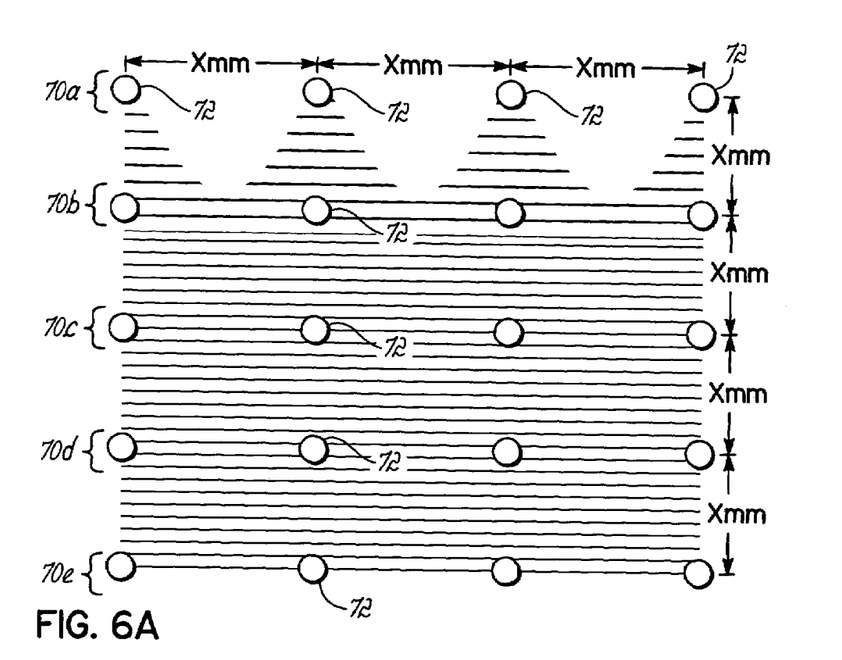
FIG. 6A illustrates an alternative array of actuators to create a non-veridical three-dimensional surface perceived by a user, while 6B illustrates the surface perception created by the array of FIG. 6A.
Figure 6B:
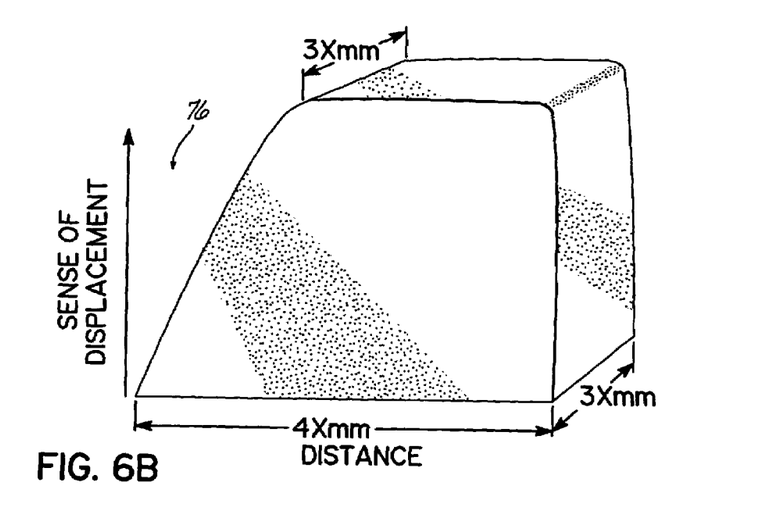

FIG. 6A reveals a 4×5 array with four actuators per row. In FIG. 6A a sweeping of actuator activation from the top row 70a to bottom row 70e will produce an elevation perception as revealed by the three-dimensional drawing representation of FIG. 6B. FIG. 6B is a conceptual representation of the non-veridical elevation perception or illusion produced by the actuators 72 in the array of 20 total actuators in FIG. 6A. All actuators are activated for the sweeps through the array as represented by the solid dots and horizontal lines across the array of actuators. When the first row 70a of actuators are activated, the subject touching or wearing the array initially does not have a full sense of non-veridical elevation perception. This is shown on the first line of four actuators 72 that represent the first horizontal row 70a of actuators. In the FIG. 6A representation, this non-perception is shown as a series of broken horizontal lines that become longer as the lines approach the second row 70b of four actuators 72, and then converge to form solid horizontal lines that extend along the entire row; e.g., rows 70c, 70d, and 70e. This transition represents a perceived sense of more forceful elevation (or sense of displacement) on the user's cutaneous or mucous membrane surface, for example, and this displacement is graphically represented in FIG. 6B. Specifically, the non-perception around rows 70a, 70b is illustrated in a lack of a sense of displacement shown in FIG. 6B by reference numeral 76.

The ability to create a perceived depth by a user or other subject is accomplished by the present invention by first defining a baseline or zero asperity reference, using a predefined number of actuators in an array. Then, the number of actuators that are activated in a particular row or column, as the rows or columns are sequentially activated is varied. Also, or alternatively, the number of rows or columns that are activated may also be varied. That is, the perceived height or depth of the surface, or an aspect of the surface, as well as the dimensions of an aspect of the surface, are determined by the number of contiguous/continuous actuators that are active and inactive in each row/column of actuators, as the rows/columns are sequentially activated in a scrolling fashion. As may be appreciated, various different activation/deactivation schemes may be utilized for the actuator array to provide the three-dimensional, non-veridical perception of a 3D veridical surface.

More specifically, lines of simultaneously activated actuators are activated, one row at a time, in a repeated, sequential or scrolling fashion. While small arrays are illustrated in the figures herein, significantly larger arrays, such as arrays that include several thousand actuators (e.g.,3,000-5,000), may be utilized as well.

As noted above, a baseline reference is first defined, and then the actuators of the basics are selectively activated/deactivated to create the perception. For example, to provide a baseline reference or zero asperity reference, only every fourth actuator in a row might be activated when the row is activated. That is, 25 percent of the actuators might be activated, as the array is scrolled. This provides a veridical baseline, or zero-asperity reference. As the array is scrolled or swept, the user feels a sweeping motion back and forth. Generally, the array is scrolled row-by-row or column-by-column, or line-by-line, in the same direction.

To facilitate a perceived aspect on a surface, such as one or more raised lumps on a surface; select rows will have a greater number of actuators activated when the row is activated, rather than the baseline amount of 25 percent (one in four). The number of contiguous actuators in a row that are then activated, and the number of sequential rows that have a greater number of actuators actuate above the baseline will define a width and/or length of a particular surface feature or aspect, such as a raised area. For example, every third and fourth actuator might be activated when the row is activated, or every other actuator might be activated when the row is activated. Selective activation/deactivation, of the actuators in each row creates a perceived non-veridical feature or aspect on the human contact or sensing surface or contact membrane for the array user, such as on the finger of a user.

In accordance with another aspect of the invention, to define the perceived height or depth of the feature, the density of actuators is also utilized, along with the force provided by each actuator against the skin and/or the displacement of an actuator against the skin or other surface of the user. For example, a displacement of 50-100 microns between adjacent actuators might be a suitable displacement for an actuator, such as a solenoid actuator. In the figures, the designation $X_{mm}$ sets forth actuator distances. In one embodiment, the actuators are equally spaced in the array. Unique spacing might also be used. Furthermore, as an example, a force of 0.006 newtons might be a suitable force against the user's skin for a solenoid actuator. Of course, other types of actuators may be used and various densities and activation forces.

For defining a perceived indentation, rather than a vertical lump, the baseline reference might be defined utilizing all the actuators, whereas a perceived indentation or hole feature might be created by selectively reducing the number of actuators that are activated in each row, rather than increasing that number. As such, the perceived non-veridical illusion would depend upon the veridical baseline or zero asperity point reference that is defined.

Figure 7A:
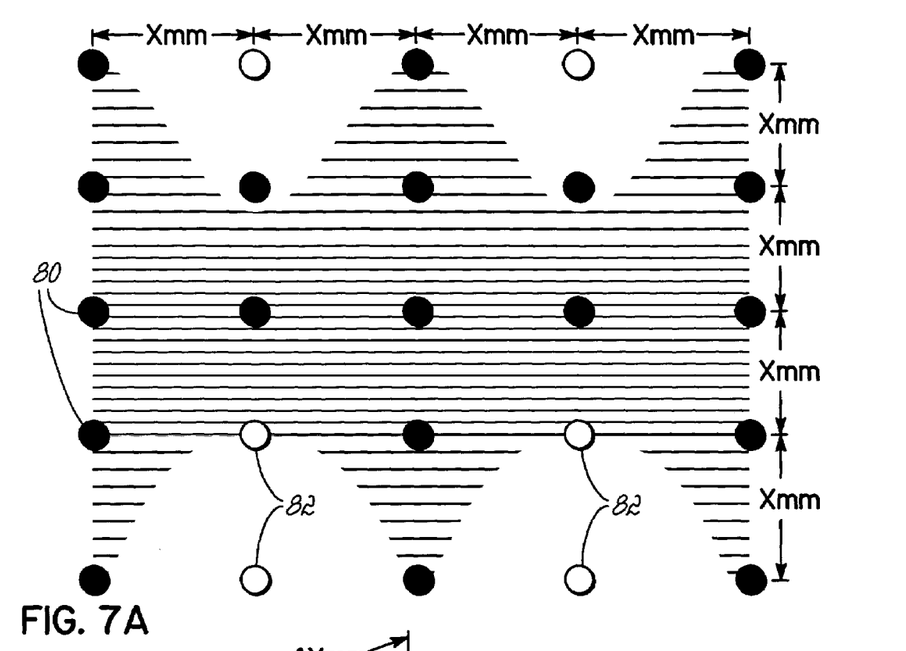
Figure 7B:
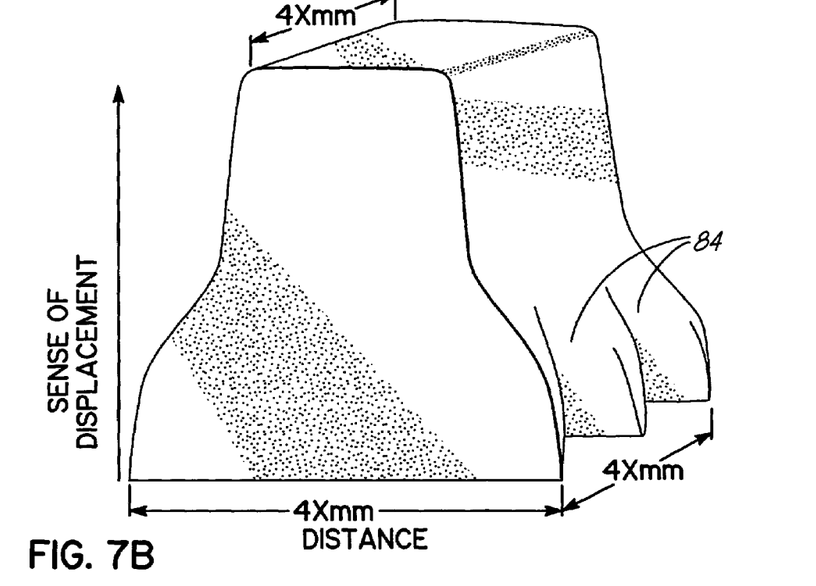
FIG. 7B illustrates the surface perceptions created by the array of FIG. 7A.

A perceived surface indentation is represented by FIGS. 7A, 7B. An irregular conformation with multiple areas of depth perception is represented by FIG. 7A, where the deactivation of active actuators is shown by non-solid dots 80 and active actuators are represented by the solid dots 82. The graphic representation of the multiple, in this case two, areas of non-veridical depth perception are shown in FIG. 7B. The areas corresponding to the deactivated actuators 82 are indicated by reference numeral 84.

Figure 8A:
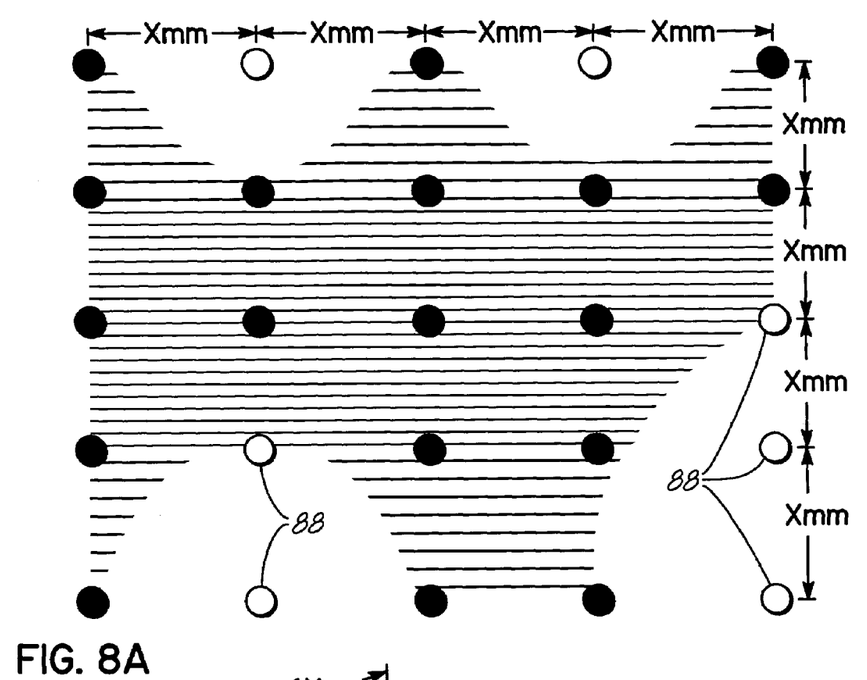
Figure 8B:
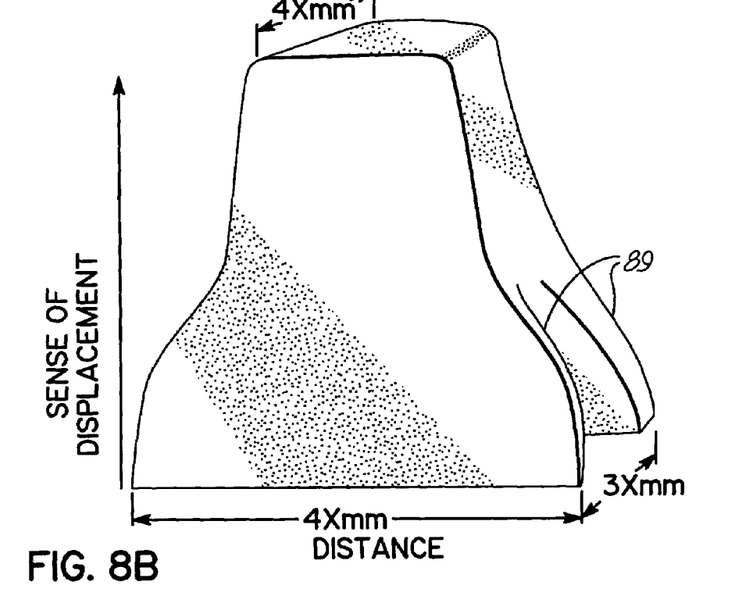
FIG. 8B illustrates the surface perceptions created by the array of FIG. 8A.

FIG. 8A-8B represent another scenario wherein multiple depth perceptions and dimensions are perceived by the selective deactivation of actuators in the array. Specifically, by deactivation of actuators 88 in the array of FIG. 8A when all of the other actuators ON define the baseline, the depth perception shown by reference numeral 89 is perceived.

In one embodiment of the invention, the pad of a fingertip, may be placed on top of an array of actuators or tactors (i.e., tactile actuators). The fingertip is left immobile upon the array, such as array 3A in FIG. 2. The tactors are sequentially activated, such as line-by-line, and the line or row of tactors is "scrolled" across the immobile fingertip. Due to the high tactile sensitivity of the fingertip, as described in U.S. Pat. Nos. 5,719,561 and 6,326,901, and their cited references, and the neurophysiological and neuroanatomical sensitivity of the cutaneous surface, the two-dimensional array distribution and separation of the tactors can accommodate an extremely close approximation of tactors. For example, spacing between tactors in the range of 1 mm or less may be suitable, such that a 20-tactor array of 4×5 elements may measure 7 mm×9 mm or less. Tactors that are piezo-electric elements, or MEMS devices, can easily be accomplished in such an area or even much smaller areas. For example, a dense array of 3000-5000 tactors may be placed in a 2 cm×2 cm array.

In another embodiment of the invention, if the fingertip is slowly scanned or moved over an array of scrolling or sweeping tactors, the area of perception of a represented surface area can be enlarged for the purpose of increasing the total area scanned. Of course, increasing an area scanned for depth and elevation can also be accomplished by keeping the fingertip stationary on the tactor array and the scrolling and sweeping of the tactor area is "moved" to a different area by utilizing a different activation of the array.

Figure 9:
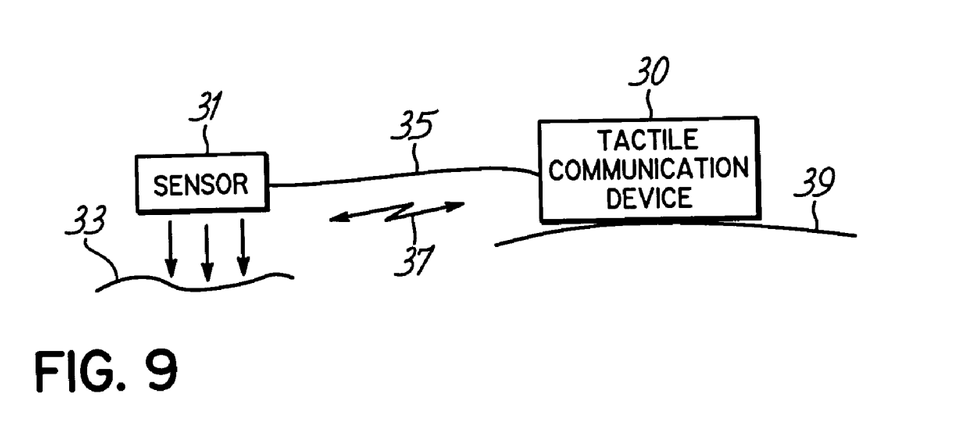
FIG. 9 illustrates the tactile communication device coupled with a sensor.

Referring to FIG. 9, the tactile or tactor array 34 of a device 30 may be operably coupled to a remote sensor, probe, camera or transducer (collectively sensor 31) that is configured to scan, read, or otherwise process a distant three-dimensional surface 33. An input signal (output by sensor 31) is fed to the tactile communication device 30 by a wired connection 35 or a wireless connection 37. The input signal (or series of signals) is an electronic representation of the surface as read or captured by sensor 31. The input signals might be processed immediately in real time or stored, such as in memory module 42 in device 30, to be processed at a later time. The input signals are directed from the data receiver 40 of device 30 or from memory 42 to the processing module or processor 44. The processor converts the input signals to multiple actuator activation sequences for the actuators of array 34 according to the invention. The array is activated, line-by-line to produce a perception at the human sensing surface of a non-veridical, three-dimensional surface based on the surface 33 scanned by sensor 31. The wireless connection 37 may be RF, an infrared signal, ultrasonically or otherwise handled, as noted in U.S. Pat. Nos. 5,719,561 and 6,326,901.

For example, a small probe 31 might be used to scan the interior surface 33 of a pipe for cracks. Through the use of a controller and digital signal processing (e.g., processing module 44) and the array 34 of the invention, a non-veridical perception of a crack or other three-dimensional feature might be transmitted to a user. Furthermore, the invention might be used to scale up a veridical feature, such as a very small crack found by a probe, so that the non-veridical image is readily perceived. Alternatively, a large surface feature might be scaled down. For example, a probe or other detector might scan the surface of Mars and then transmit a detected feature to the array of the invention; wherein, a large planetary feature is perceived on the fingertip of a user, such as a 1 cm×1 cm array. Therefore, in accordance with another aspect of the invention, the device, such as the processing module 44, has the ability to introduce gain (increase) or attenuation (decrease) into the input signal to affect the non-veridical perception and accentuate or scale down a feature of the sensed surface.

Alternatively, the tactile device 30 may be in close approximation to the sensor 31. An example would be a glove of a suit such as a diving suit or space suit, where a thin or thick layer of the suit separates the outer surface sensors or cameras and the inner surface of the glove that contains the array of tactors that rests against the fingertip. Alternatively, the tip of a tongue may be placed against the device 30 and array 34 of tactors that is on a membrane surface with the other side of the membrane containing the sensors.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed:

1. A method for creating a three-dimensional perception on a human, the method comprising:
    positioning an array of actuators against a sensing surface of a human;
the actuators each being separately activatable to impinge upon the sensing surface to be sensed by the surface, the actuators being arranged in linear groups of multiple adjacent actuators to form the array;
    activating actuators of a first linear group;
    sequentially activating actuators of a second linear group adjacent to the first linear group and then activating successive adjacent linear groups of actuators in a scrolling sequential fashion proceeding through the array;
    repeating the scrolling sequential activation of the linear groups to define a baseline reference for the sensing surface; and
    at least one of selectively activating or selectively deactivating actuators of a linear group in successive scrolling to deviate from the baseline reference to create the three-dimensional perception at the sensing surface.

2. The method of claim 1 wherein the linear group is one of a row and a column.

3. The method of claim 2 further comprising activating actuators of a row and sequentially activating actuators of an adjacent second row.

4. The method of claim 3 further comprising selectively activating or deactivating actuators in a row of actuators to deviate from the baseline reference.

5. The method of claim 3 further comprising selectively activating or deactivating an entire row of actuators to deviate from the baseline reference.

6. The method of claim 2 further comprising activating actuators of a column and sequentially activating actuators of an adjacent second column.

7. The method of claim 6 further comprising selectively activating or deactivating actuators in a column of actuators to deviate from the baseline reference.

8. The method of claim 6 further comprising selectively activating or deactivating an entire column of actuators to deviate from the baseline reference.

9. The method of claim 1 further comprising of selectively activating a greater number of actuators in a linear group during successive scrolling to deviate from the baseline reference so the sensing surface perceives a three-dimensional illusion raised from the baseline reference.

10. The method of claim 1 further comprising selectively deactivating actuators in a linear group during successive scrolling to deviate from the baseline reference so the sensing surface perceives a three-dimensional illusion sunken from the baseline reference.

11. The method of claim 1 further comprising sweeping the sensing surface over the array.

12. A tactile communication device comprising:
an array of actuators configured to be located against a sensing surface of a human;
the actuators each operable, when activated, to impinge upon the sensing surface to be sensed by the surface;
the array including adjacent lines of actuators;
the device operable for activating the actuators, line by line, in a sequential scrolling fashion;
the device further operable for sequentially scrolling through the lines of actuators to define a baseline reference, and then to at least one of selectively activate or selectively deactivate actuators of a line, while scrolling, to deviate from the baseline reference;
to produce a perception of a three dimensional surface by the human sensing surface.

13. The device of claim 12 further comprising a controller for sequentially activating the lines of actuators according to an input signal.

14. The device of claim 12 wherein the lines of actuators are one of rows or columns of the array.

15. The device of claim 12 wherein the device is further operable to selectively activate a greater number of actuators in a line during successive scrolling than previously activated in that line, to deviate from the baseline reference and produce a perception of a raised three-dimensional surface.

16. The device of claim 12 wherein the device is further operable to selectively activate a lesser number of actuators in a line during successive scrolling than previously activated in that line, to deviate from the baseline reference and produce a perception of a sunken three-dimensional surface.

17. A tactile communications device comprising:
a plurality of tactile actuators arranged in adjacent lines to form a two-dimensional array, the actuators each being separately activatable to impinge upon a human sensing surface to be sensed by the surface;
the device operable for sequentially activating individual lines of actuators, in a scrolling fashion to define a baseline reference and then to selectively activate or selectively deactivate actuators of at least one line to produce a non-veridical perception of a three-dimensional surface at the human sensing surface.

18. The device of claim 17 wherein the device is further operable to activate a defined number of actuators in the array during initial scrolling to define a baseline reference and then to activate, in successive scrolling, a greater number of actuators in the array than previously activated, to deviate from the baseline reference and produce a perception of a raised three-dimensional surface.

19. The device of claim 17 wherein the device is further operable to activate a defined number of actuators in the array during initial scrolling to define a baseline reference and then to activate, in successive scrolling, a lesser number of actuators in the array than previously activated, to deviate from the baseline reference and produce a perception of a sunken three-dimensional surface.

* * * * *